D. W. Hamaker.
Grain Drill.
No. 86,068.　　　　　　　　　　Patented Jan. 19, 1869.
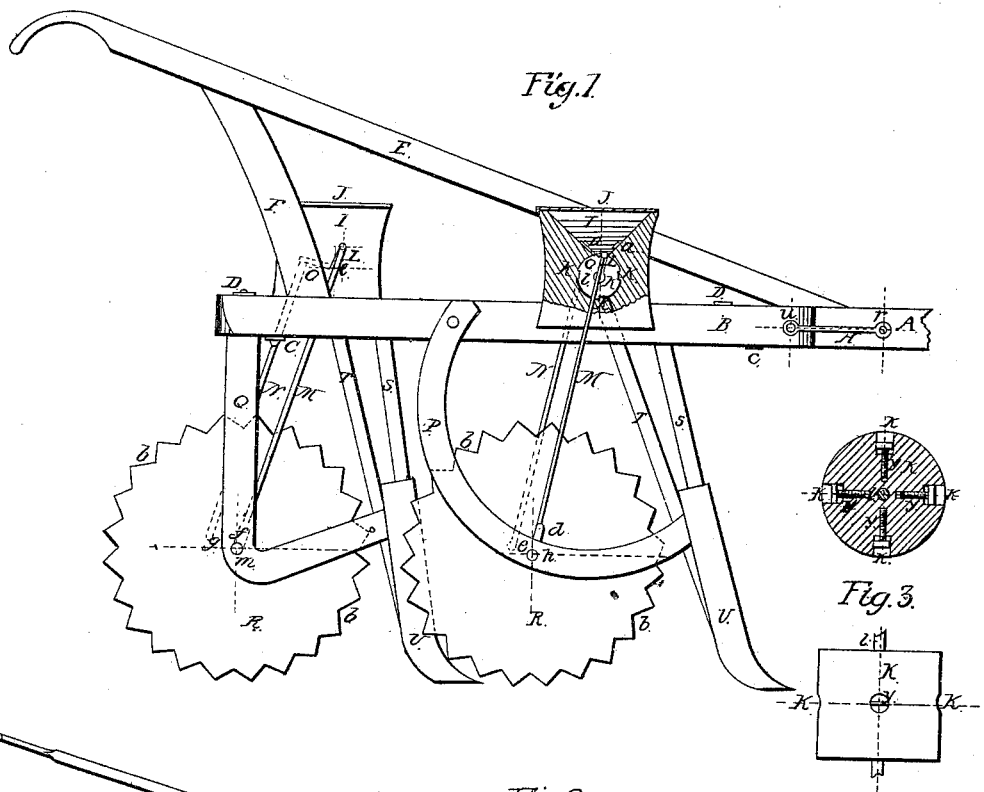
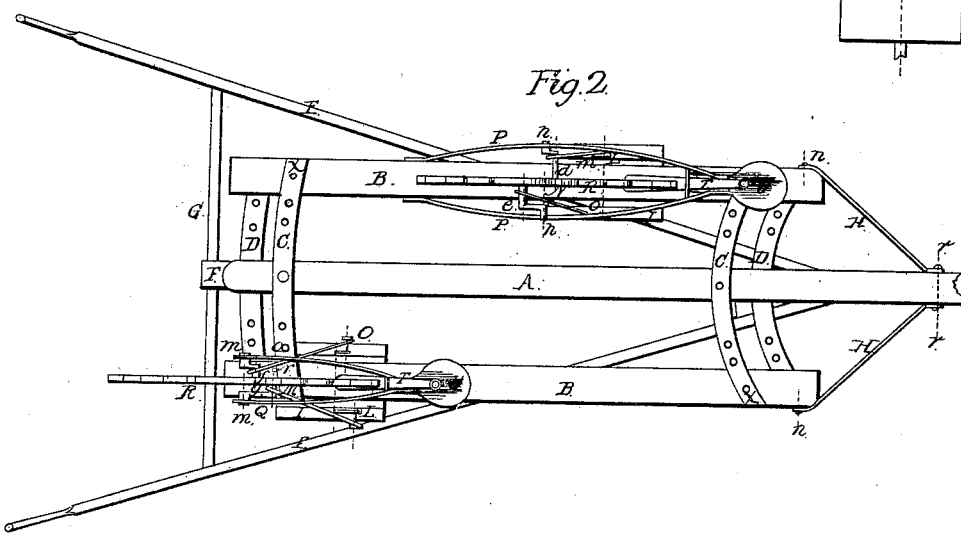
Witnesses:
Ruth K. Abbott
A. W. Heldenbrand
Inventor:
Daniel W. Hamaker
By Job Abbott, Attorney

DANIEL W. HAMAKER, OF UNION STAR, MISSOURI.

Letters Patent No. 86,068, dated January 19, 1869.

---

IMPROVEMENT IN SEED AND GRAIN-DRILLS.

---

The Schedule referred to in these Letters Patent and making part of the same.

---

*To all whom it may concern:*

Be it known that I, DANIEL W. HAMAKER, of Union Star, in the county of De Kalb, and State of Missouri, have invented new and useful Improvements in Seed and Grain-Drills; and I do hereby declare that the following is a full, clear, and exact description of my invention, reference being had to the accompanying drawings, forming a part of this specification, and to the letters of reference marked thereon, of which drawings—

Figure 1 is an elevation of my improved drill.

Figure 2 is a plan of my drill when turned upside down.

Figure 3 is a cross-section and plan of dropping-pulley.

The nature of my invention consists in the novel construction of a seed or grain-drill, designed especially for drilling in wheat between rows of standing corn, but which may be used for drilling wheat or other kinds of seed in any situation, the peculiar utility of my improved drill consisting in the ease with which the distance between the drills may be changed to suit any desired kind of work; the security afforded against any slipping of the drive-wheels, whereby the regularity of the dropping of the grain or seed is insured; the whole forming a cheap and efficient implement of great value, especially to the farming-community in new countries, where the land is strong and capable of bearing continuous crops, and the capital of the community too small to afford expensive drills, and where the difficulty of getting any repairs made on complicated machinery is very considerable.

To enable others skilled in the art to make and use my invention, I will proceed to describe its construction and operation.

A is the main beam of my drill, and has mortised in it, near the rear end, the standard F, in the upper end of which is the cross-bar G, the ends of which are secured in the handles E E, as shown, the lower ends of said handles being secured to the beam A, as seen in fig. 2.

The outer beams B B are secured, at their front ends, to the centre beam A, by means of the links H H, which are secured to the beam A and the beams B B, by bolts or screws $r\ r$, $u\ u$, as shown.

The cross-pieces C C, D D are of plate-iron, curved, to conform, on each side of the beam A, to the shape of the circumference of circles, with their centres at $r\ r$, or at the ends of the bolts which secure the links H H to the beam A, as shown, the pieces D D being above, and the pieces C C being below the said beam, as seen in fig. 1.

The outer beams B B set between these cross-pieces, and are secured, in any desired position, by bolts or screws $x\ x$, which pass through holes made in the pieces C D, and screw into the beams B B, or pass through them, and are secured, by nuts, on the opposite side.

By having a series of holes made in the pieces C D, it is readily seen that the distance between the beams B B, and, consequently, the distance between the drills attached to them, may be changed as desired; and, further, that one beam, B, with its drill, may be brought close to the beam A, and the other beam, B, with its drill, be secured at some distance from it, so that, where four rows or drills of grain are to be put in, the horse or power attached to the beam A may travel on or near the centre of the row, in passing up and down the same.

The standards S S are secured in the beams B B, in the position shown, and on their lower ends are secured the teeth U U, which are formed of plate-steel pressed into the form shown.

The brace-pieces P P and Q Q are shaped in the general form shown, and are secured to the beams B B and inner sides of the teeth U U, and serve both to brace the teeth U U and carry the axes of the driving-wheels R R.

These driving-wheels R R may be made of sheet-metal, or of wood with iron tires, and have the saw-shaped periphery shown, which prevents any slipping of said wheels, which would produce irregularities in seeding.

The crank-axles $d\ e$ and $f\ g$ are secured in the wheels R R, at an angular distance of ninety degrees from each other, and their ends are so arranged as to form the axes of the wheels R R, and are pivoted in the brace-pieces P Q, as shown.

The hoppers I I are made in the form shown, and have the covers J J, to prevent the grain or seed from spilling out.

The dropping-pulleys K K are of circular cross-section, and have the holes $k\ k\ k$ arranged on their periphery, as shown.

In the lower part of these holes $k\ k$ are arranged the screws $y\ y$, as seen in fig. 3, the heads of said screws being of the same diameter as the holes $k\ k$, and their stems screwing into holes in the pulley K, as shown, from which it is readily seen that the quantity of seed dropped by each hole, $k$, may be varied at pleasure, by raising or lowering the screw $y$, or that, if desired, one or more of said holes may be prevented from dropping, by raising the head of the screws $y$ up flush with the face of the pulley K.

These dropping-pulleys are hung on shafts $l\ l$, in the hoppers I I, and on the ends of these shafts, outside of the hoppers, are secured the cranks L and O, which are arranged at right angles with each other.

The connecting-rods M M and N N connect these cranks L L and O O with the crank-axles $d\ f$ and $e\ g$, of the drive-wheels R R, from which it is readily seen that the rotation of the drive-wheels R R, caused by drawing the machine along the ground, will cause a corresponding rotation of the dropping-pulleys K K.

The hoppers I I are so constructed as to fit closely to the dropping-pulleys K K, as seen in the hopper on the right-hand side of fig. 1, and valves $a\ a$, of leather or other flexible material, are arranged, as shown, to prevent any grain or seed from working down between the hoppers I and dropping-pulleys K.

The tubes T T are arranged with their upper ends in the hoppers I I, and directly under the pulleys K K, and their lower ends extending down behind and nearly to the bottom of the teeth U, as shown.

It is readily seen, from the foregoing description, that, by applying power to the front end of beam A, the machine may be drawn along the ground, being guided by means of the handles E E, and that the teeth U U will plough a trench for the grain or seed, which will be carried from the hoppers I I, by the holes $k\ k$ in the pulleys K K, during the revolution of said pulleys, caused by the wheels R R, as before shown, and dropped down the tubes T T, each time a hole, $k$, comes opposite the top of said tubes, and that the grain or seed so dropped will be covered by the earth falling over and around the teeth U U, thus drilling in the grain or seed in an effectual manner.

Having thus fully described my invention,

What I claim as new, and desire to secure by Letters Patent, is—

1. The drive-wheels R, when constructed with saw-shaped periphery $b$, substantially as and for the purpose herein specified.

2. The peculiar arrangement and combination of the beam A, links H H, cross-pieces C C, D D, and outer beams B B, each beam, B, having a hopper, with dropping-pulley K, standard and tooth S U, dropping-tube T, and drive-wheel R, secured thereto, the several parts being arranged and combined, substantially as and for the purpose herein specified.

3. The adjustable grain or seed-drill, herein described, composed of the beam A, standard F, cross-bar G, handles E E, cross-pieces C C, D D, outer beams B B, links H H, standards and teeth S S, U U, dropping-tubes T T, brace-pieces P P, Q Q, drive-wheels R R, with saw-shaped peripheries $b\ b$ and crank-axles $d\ e\ f\ g$, connecting-rods M M, N N, dropping-pulleys K K, with holes $k\ k$, adjusting-screws $y\ y$, and shafts $l\ l$, with cranks L O, L O, hoppers I I, with guard-valves $a\ a\ a\ a$ and covers J J, the several parts being constructed, combined, and arranged substantially as and for the purposes herein set forth.

As evidence that I claim the foregoing, I have hereunto set my hand, in the presence of two witnesses, this 10th day of November, A. D. 1868.

DANIEL W. HAMAKER.

Witnesses:
W. M. SHANKS,
HENRY BLOUNT.